United States Patent
Barsumian et al.

(10) Patent No.: US 9,209,856 B2
(45) Date of Patent: Dec. 8, 2015

(54) SPREAD SPECTRUM NON-LINEAR JUNCTION DETECTOR

(71) Applicants: Bruce R. Barsumian, Cookeville, TN (US); Thomas H. Jones, Cookeville, TN (US); Darrell L. Harmon, Denver, CO (US)

(72) Inventors: Bruce R. Barsumian, Cookeville, TN (US); Thomas H. Jones, Cookeville, TN (US); Darrell L. Harmon, Denver, CO (US)

(73) Assignee: Research Electronics International, Cookeville, TN (US)

( * ) Notice: Subject to any disclaimer, the term of this patent is extended or adjusted under 35 U.S.C. 154(b) by 40 days.

(21) Appl. No.: 14/022,172

(22) Filed: Sep. 9, 2013

(65) Prior Publication Data

US 2015/0071330 A1    Mar. 12, 2015

(51) Int. Cl.
*H04B 1/707* (2011.01)
*G01V 3/12* (2006.01)

(52) U.S. Cl.
CPC . *H04B 1/707* (2013.01); *G01V 3/12* (2013.01)

(58) Field of Classification Search
CPC . H04B 1/707; H04B 1/709; H04B 2001/7154
USPC .......................... 375/146, 140, 130
See application file for complete search history.

(56) References Cited

U.S. PATENT DOCUMENTS

| 7,058,530 B1 | 6/2006 | Miller et al. | |
| 7,212,008 B1 | 5/2007 | Barsumian et al. | |
| 7,630,853 B2 | 12/2009 | Barsumian et al. | |
| 7,808,226 B1 | 10/2010 | Barsumian et al. | |
| 2006/0144170 A1* | 7/2006 | Stephen et al. | 73/865.9 |
| 2011/0090126 A1* | 4/2011 | Szini et al. | 343/702 |
| 2012/0236905 A1 | 9/2012 | Judd et al. | |
| 2013/0210353 A1* | 8/2013 | Ling et al. | 455/41.1 |

* cited by examiner

*Primary Examiner* — Michael Neff
(74) *Attorney, Agent, or Firm* — Hornkohl Intellectual Property Law, PLLC; Jason L. Hornkohl

(57) ABSTRACT

A digital spread spectrum non-linear junction detector (NLJD) utilizes the 2.4 GHz transmission band to increase sensitivity to detect smaller electronics. The receiver chain of the NLJD pre-distorts the transmission signal and correlates the result with the response signal to differentiate between target responses and ambient interference signals. A touch screen display displays a signal strength received by the NLJDs receiver at a second harmonic frequency of the 2.4 GHz transmit signal and a signal strength received by the receiver at a third harmonic frequency of the transmit signal. A frequency swept response received by the receiver in response to the transmitted 2.4 GHz transmit signal is graphically displayed on the touch screen. The use of the 2.4 GHz band, touch screen, correlation based target differentiation and frequency swept response display improve the sensitivity and usability of the NLJD and increase the likelihood of it successfully performing its tasks.

12 Claims, 4 Drawing Sheets

SPREAD SPECTRUM NON-LINEAR JUNCTION DETECTOR

STATEMENT REGARDING FEDERALLY SPONSORED RESEARCH OR DEVELOPMENT

Not Applicable.

CROSS-REFERENCES TO RELATED APPLICATIONS

The present application claims priority from co-pending Provisional Patent Application No. 61/699,266 entitled "Spread Spectrum Non-linear Junction Detector" filed Sep. 10, 2012.

REFERENCE TO SEQUENCE LISTING OR COMPUTER PROGRAM LISTING APPENDIX

Not Applicable.

BACKGROUND OF THE INVENTION

Non-linear junction detectors (NLJD) are used to detect harmonic signals re-radiated from a non-linear junction in response to a transmitted signal. Non-linear junctions are typically found in two main categories of things, corrosive metal junctions and semiconductor containing electronics. NLJDs can detect these junctions whether they are concealed or operating.

A NLJD is used in a fashion similar to a hand-held metal detector and a highly technically skilled operator is not required to use the device. As a result, there are large number of practical everyday applications for NLJDs. For example, NLJDs are used to detect lost or concealed electronics in items such as mud, tall grass or concrete, or inside of a wall, pipe or furniture, without the need to tear up the item being searched and regardless of whether the devices are operating. NLJDs are also used to detect corrosion or defects in pipes or welds and to trace certain types of buried or hidden cables and wires. NLJDs are used by security forces to search for mobile phones and weapons.

NLJDs are also one of the main tools used in performing counter surveillance sweeps, or Technical Surveillance Counter Measures (TSCM). TSCM are the security processes of ensuring that a room or area within a building does not contain any illegal or nefarious bugging devices such as microphones, hidden surveillance cameras, digital recorders, or radio frequency (RF) transmitters. There are a wide range of organizations that benefit from sweep services including commercial, law enforcement, and government organizations. While government organizations are often concerned with political or military information; commercial organizations have a great need for sweep operations to protect information such as trade secrets, new product developments or technology, marketing plans, mergers and acquisitions, important employee information, etc. Furthermore, TSCM operations play a big role in VIP protection plans for political figures, sports figures, celebrities, etc. A NLJD is a very useful tool for performing sweeps because it provides the ability to detect the presence of hidden surveillance devices, even when the device's electronics are not operating, or turned on, or concealed in concrete.

Thus, there is an existing need for NLJDs and improvements to their design and functionality that allow them to better perform their numerous commercial and governmental tasks.

BRIEF SUMMARY OF THE INVENTION

An embodiment of the present invention is directed toward a non-linear junction detector that includes a spread spectrum transmitter that utilizes digital modulation and transmits a transmit signal in the 2.4 GHz transmission band and a receiver that receives a re-radiated response to the transmit signal. Orthogonal frequency-division multiplexing (OFDM) is a method of encoding digital data on multiple carrier frequencies and preferably utilized by the NLJD transmitter. The transmit signal may be designed to mimic standard communication signals such as WIFI, Bluetooth, CDMA, GSM, PCS, etc. A receiver chain in the non-linear junction detector pre-distorts the transmit signal to predict a second and third harmonic re-radiated response and differentiate between an actual response signal and an interfering signal. The receiver chain squares and cubes the transmit signal to pre-distort the transmit signal. The receiver chain then correlates the pre-distorted transmit signals and the signal strengths received at the second and third harmonic frequencies. A processor utilizes an algorithm to compare the correlation level of the received signal with the received power level to differentiate between highly correlated actual responses and false alarms from interfering signals. The NLJD processor also preferably includes an algorithm that evaluates statistical variations in the received second or third harmonic response signals as a function of time.

The preferred embodiment includes a touch screen display that displays a signal strength received by the receiver at the second harmonic frequency of the transmit signal and a signal strength received by the receiver at the third harmonic frequency of the transmit signal. The touch screen display also displays a frequency swept response received by the receiver in response to the transmit signals and a histogram of the received responses as a function of time. The digital spread spectrum transmitter produces a wireless RF audio output that is received by a set of wireless headphones. The wireless audio output is preferably an RF transmit signal that operates between a non-linear junction detector radio frequency transmit waveform of the transmit signal and contains digitally modulated audio packets designed to operate with the RF wireless audio receiver in the headphones.

Another embodiment of the present invention is designed for frequency interference and avoidance. This is achieved by having a receiver that monitors the fundamental transmit frequency band, the second harmonic frequency band, and the third harmonic frequency band. In this embodiment, the NLJD receiver scans these fundamental and harmonic frequency bands when it is first turned on to search for quiet frequency channels. The NIJD can also scan these frequency bands in between transmit pulses so that it automatically avoids noisy frequency bands if other transmitters come into the operational environment. This function helps to prevent or minimize the chances that the unit will either cause interference or experience interference from other RF signals in the environment.

An especially preferred embodiment of the invention includes a haptic feedback response system to improve the usability and reliability of the unit. The algorithm to control the haptic feedback response is preferably based on the receiver correlated response of the second and third harmonic received signals.

An alternative embodiment of the present invention utilizes a direct connection to a conductor or cable to detect non-linear junctions that are potentially associated with the conductor or cable.

DETAILED DESCRIPTION OF THE INVENTION

Figure 1:
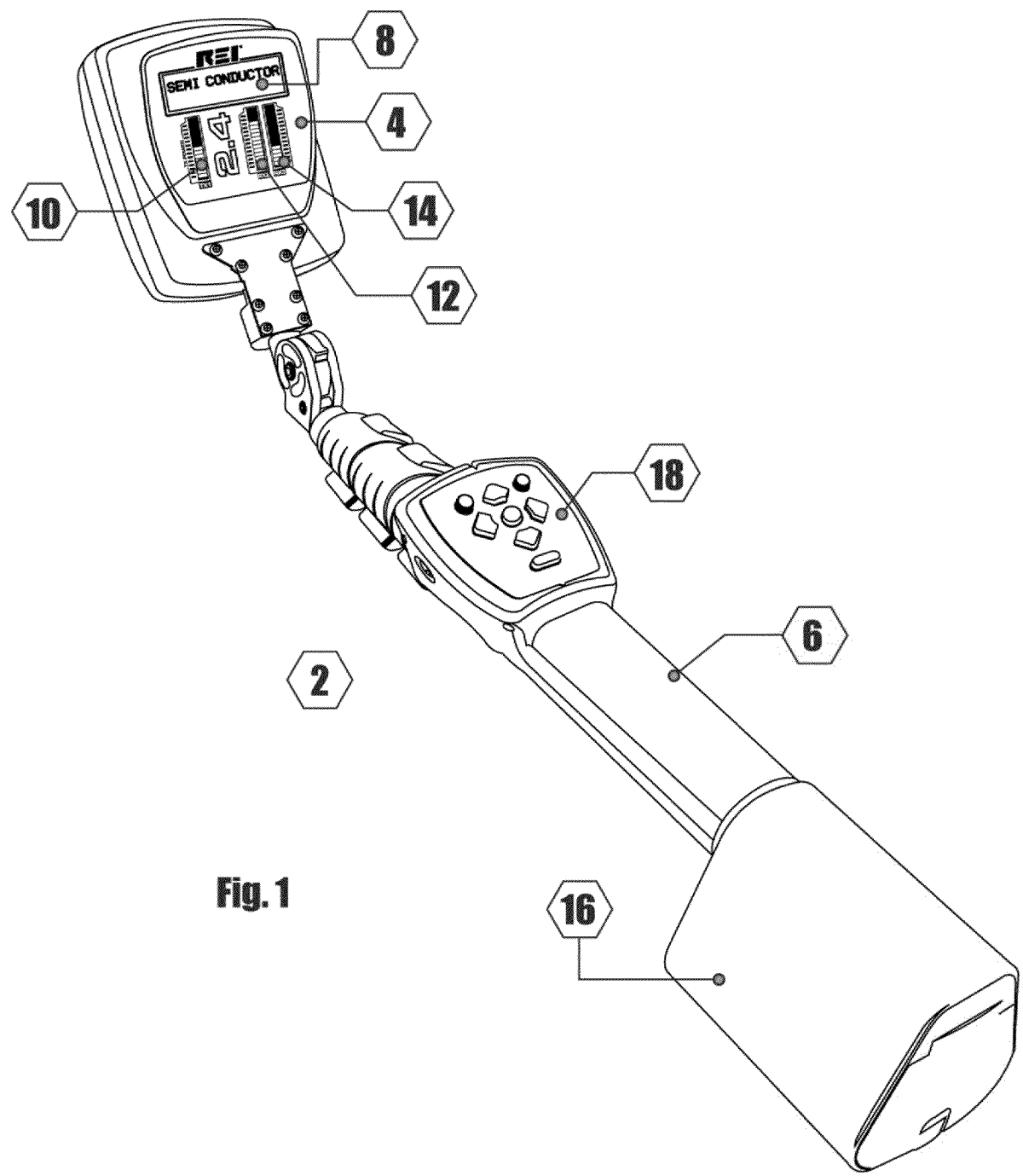
FIG. 1 is an illustration of an non-linear junction detector constructed in accordance with embodiment of the present invention.

Referring now to FIG. 1, an illustration of a non-linear junction detector (NLJD) 2 constructed in accordance with embodiment of the present invention is shown. The non-linear junction detector 2 has a display 4 that is mounted on an upper head portion of an elongated pole-shaped body 6. The display 4 has a text display 8 and three bar graph displays 10, 12 and 14. The text display 8 is used to display operating modes and assist the user in navigating the operating menus of the NLJD.

The bar graph displays 10, 12 and 14 respectively display the transmit power level 10, the semiconductor, or second harmonic frequency, non-linear junction received signal strength level 12, and the corrosive, or third harmonic frequency, non-linear junction received signal strength level 14. The transmit power level 10 represents the power of the output signal produced by the transmitter of the NLJD 2. The semiconductor non-linear junction received signal strength 12 represents the received signal strength at the second harmonic frequency of the transmitted signal and is indicative of the presence of a semiconductor based junction, such as is found in electronics. The corrosive non-linear junction received signal strength 14 represents the received signal strength at the third harmonic frequency of the transmitted signal and is indicative of the presence of a corrosive metal junction.

A key pad having a set of input keys 18 is positioned on the pole shaped portion of the NLJD body 6. These keys 18 control NLJD 2 functions such as power on/off, signal strength up/down, audio output up/down, menu navigation, etc.

The transmitter, receiver and antenna of the NLJD 2 are preferably enclosed within a housing 16 at one end of the pole shaped body 6 as discussed in more detail below.

Figure 2:
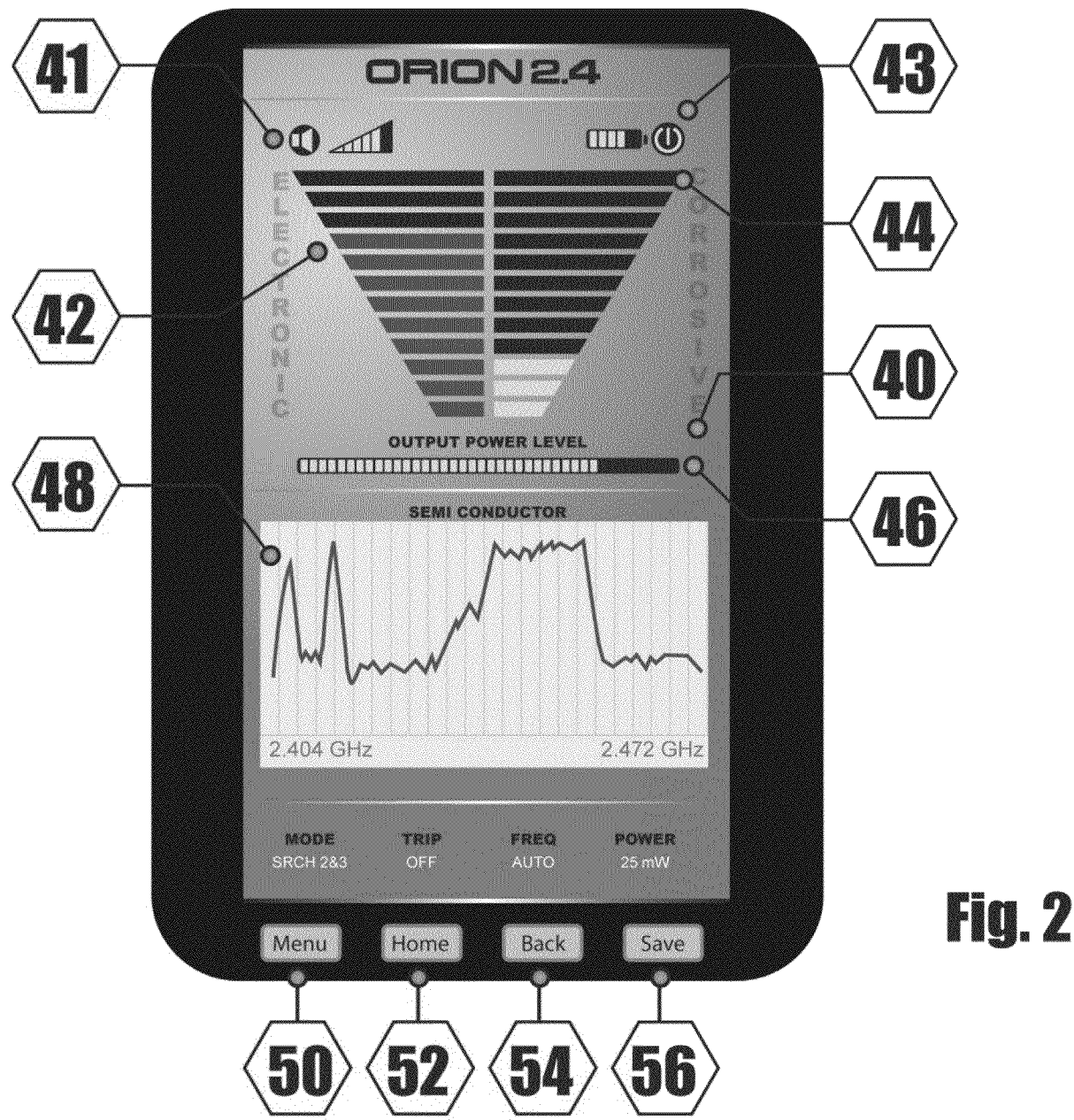
FIG. 2 is an illustration of a non-linear junction detector touch screen display constructed in accordance with an embodiment of the present invention.

Referring now to FIG. 2, an illustration of a touch screen display for use with a preferred embodiment of the present invention is shown. The touch screen display 40 is preferably a color, sunlight readable LCD display. The touch screen display 40 is used to control the various functions of the NLJD through the use of interactive menus and interface buttons 50, 52, 54 and 56 that are displayed on the screen. The touch screen display 40 may be positioned on the upper portion of the detector as a replacement for the display shown in FIG. 1, or connected to the pole of the detector and used in connection with the display 4 of the NLJD of FIG. 1.

An audio output level 41 and a battery power level 43 are shown on the touch screen display 40. The touch screen 40 displays the semiconductor or electronic received signal strength 42. The touch screen display 40 also displays the corrosive received signal strength 44. If desired, different transmit power levels may be displayed in ramped up manner from the lowest transmit power to the highest transmit power level.

The display 40 shows the current output transmitter power level 46 in the form of a bar graph. A graphics display on the touch screen is used to display a frequency spectrum 48 for the received signal and/or a histogram of second and third harmonic received signal strengths over a period of time.

Figure 3:
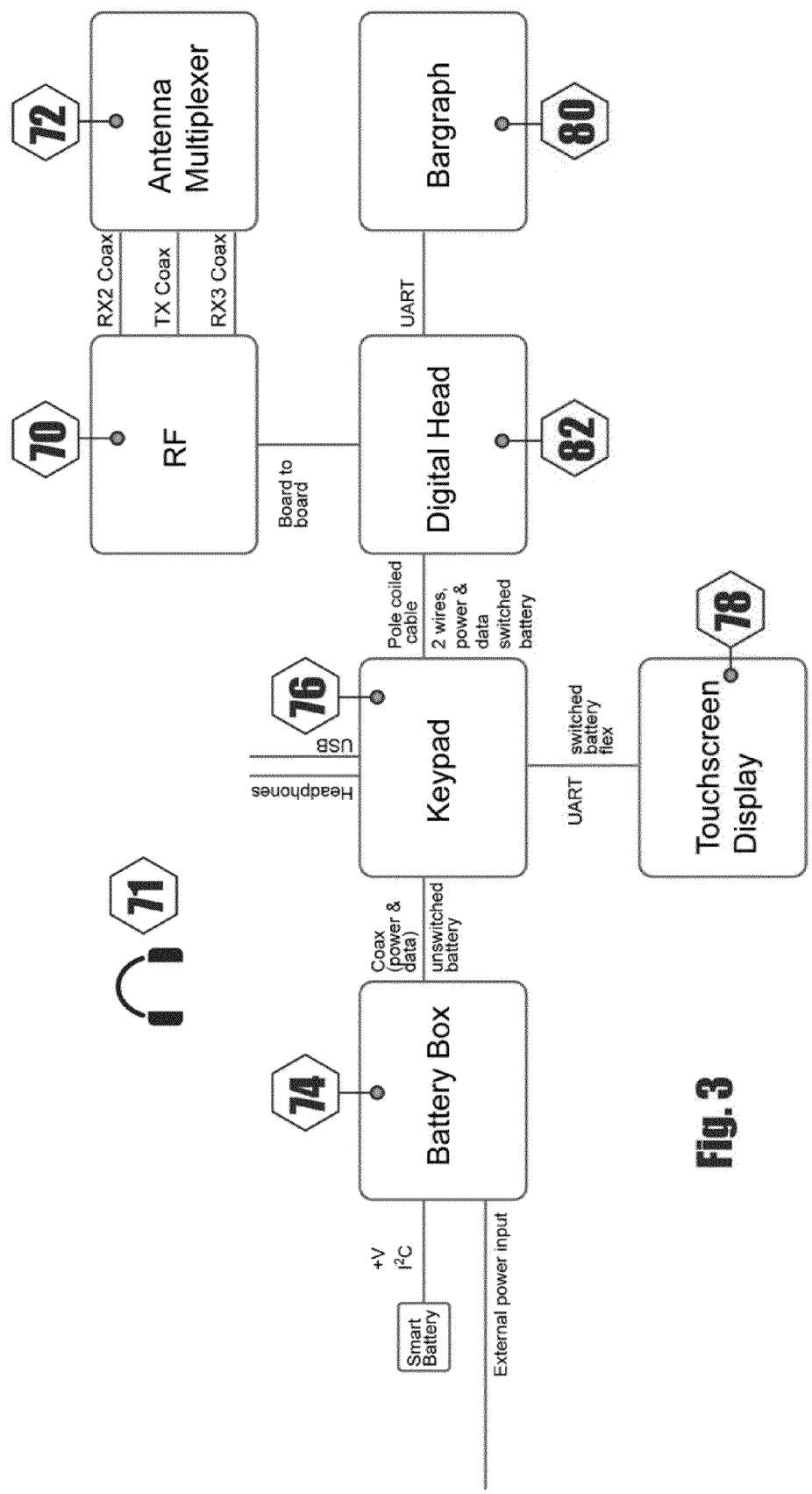
FIG. 3 is a block diagram of the components of a non-linear junction detector constructed in accordance with an embodiment of the present invention.

Referring now to FIG. 3, a block diagram of the system level components of a non-linear junction detector constructed in accordance with an embodiment of the present invention is shown. The basic system level components of a NLJD constructed in accordance with the preferred embodiment are an RF system board 70, an antenna system 72, a battery 74, a key pad 76, a touch screen display 78, a bar graph display 80 and a head digital electronics board 82. The functions of the key pad 76, bar graphs 80 and touch screen display 78 are discussed above with respect to FIGS. 1 and 2.

The head digital electronics board 82 contains the electronics needed to manage the functions and systems of the NLJD. The NLJD uses the RF board 70 to create and transmit the transmit signal and receive and process the response signals. The NLJD of the present invention preferably uses a 2.4 GHz spread spectrum transmit signal in the 2.4 GHz transmission band. There several benefits to using the 2.4 GHz transmission band for the transmit signal. Higher frequency non-linear junction detection works much better than lower frequency methods when detecting the smaller surface mount electronics typical in modern surveillance devices. A NLJD works on the principal that radio frequency energy can be absorbed by electronic circuits and re-radiated at harmonic frequencies. With very small circuitry, higher frequencies work better because the circuit traces and wiring basically act as small antenna which absorb the RF signals.

The NLJD preferably generates a digitally modulated transmit signal containing random or pseudo random data. Digital modulation with pseudo random data is used to spread the signal, reducing power spectral density, which allows for FCC compliance under part 15 section 247. Also, digital modulation allows for correlation of the received signal which allows the NLJD to confirm that a signal is a re-radiated version of itself and increases the reliability, detection range and sensitivity of the NLJD. The RF board 70 has receivers tuned to the second and third harmonics of the transmit frequency and the ability to correlate the received signal with the transmitted signal.

The RF board 70 of the NLJD includes a receiver in the 2.4 GHz transmit band. The receiver allows ambient signals in the transmit frequency band to be identified and avoided by changing to an open frequency. The receiver preferably monitors the fundamental transmit frequency band, the second harmonic frequency band, and the third harmonic frequency band. The NLJD receiver scans these fundamental and harmonic frequency bands when it is first turned on to search for quiet frequency channels for it to operate in. The NLJD also scans these frequency bands in between transmit pulses so that it automatically avoids noisy frequency bands if interfering transmitters dynamically come into the operational environment. This reduces the likelihood that the RF board 70 will either cause or experience interference from other RF signals in the environment.

Higher frequency operation in the 2.4 GHz band is further beneficial in that it allows the use of a smaller antenna and smaller electronics in the NLJD. As a result, the overall product is smaller and lighter and all of the RF electronics can be positioned in the main head of the NLJD antenna.

The NIJD preferably has the capability to transmit and receive using a spread spectrum signal with Orthogonal Frequency Division Multiplexing (OFDM) modulation. The use of a spread spectrum transmit signal increases the detection range of the NLJD for a given average power. Using a spread spectrum transmit signal also increases the detection range by integrating the receive signal and increasing the signal to noise ratio. Using spread spectrum also reduces the power spectral density. Spread spectrum non-linear junction detection permits the use of multiple NLJD units within the same environment without interference because the units can utilize different spread spectrum codes.

The transmit signal is most preferably an OFDM signal at 5 MS/s that is created by a waveform generator on the RF board 70. It is interpolated to 80 MS/s and frequency shifted by a small amount (2 to 4 MHz). It is then split into its real and imaginary components and a scale and offset factor is applied to allow power control as well as correct for digital-to-analog conversion and modulator errors. While OFDM digital modulation is preferred, various other types of digital modulation can be used including but not limited to: FSK, QAM, QPSK, GFSK, MSK, etc.

The spread spectrum transmitter in the RF board 70 used to produce the transmit signal is also preferably configured to produce a digital wireless audio signal that is transmitted in digital packets between the NIJD signals and received by wireless earphones or headphones 71 of the NLJD. Using the same transmitter to perform the NLJD functions and provide wireless audio for the headphones 71 of the operator results in a less expensive and more reliable NLJD.

The receiver chain on the RF board 70 takes the signal from the waveform generator, squares it for the second harmonic, cubes it in the case of third harmonic, conjugates it, and multiplies it by the decimated and frequency shifted signal from the receiver's analog-to-digital converter. The resulting signal is a cross correlation of the transmit signal, with distortion applied by the square and cube to match that of the device, and receive signals at a fixed delay. This process is described in more detail below with respect to FIG. 4. This correlation signal can be integrated for any desired amount of time to produce a value proportional to the integration time and the harmonic created by the target. This process rejects random noise allowing 20 to 40 dB of additional sensitivity for a given bandwidth. The NLJD's sensitivity is also increased by correlating on the harmonic digitally modulated signal.

The correlation value can be converted to an angle to measure the phase of the response. The phase can then used to produce an audio output that is either phase or frequency modulated. Alternatively, an audio output can be produced based on the magnitude of the correlation value if desired and transmitted to the wireless headphones 71 as described above. The phase shift measurements can further be used as a discrimination function for group delay and phase shifts associated with RF circuits.

The RF board 70 preferably includes an algorithm that evaluates statistical variations in the received second or third harmonic signals as a function of time. A corrosive type junction is generally not a stable non-linear junction structure as it is typically formed from random corrosive processes. Therefore, second and third harmonic responses will typically vary as a function of time in the presence of physical vibration or the pulsing of a transmitted RF waveform. Conversely, an electronic semiconductor based non-linear junction formed by man-made semiconductor components is very stable and does not change under these scenarios. Therefore, semiconductor junctions will typically have a very stable statistical response especially in the presence of physical or electromagnetic stimulation.

Figure 4:
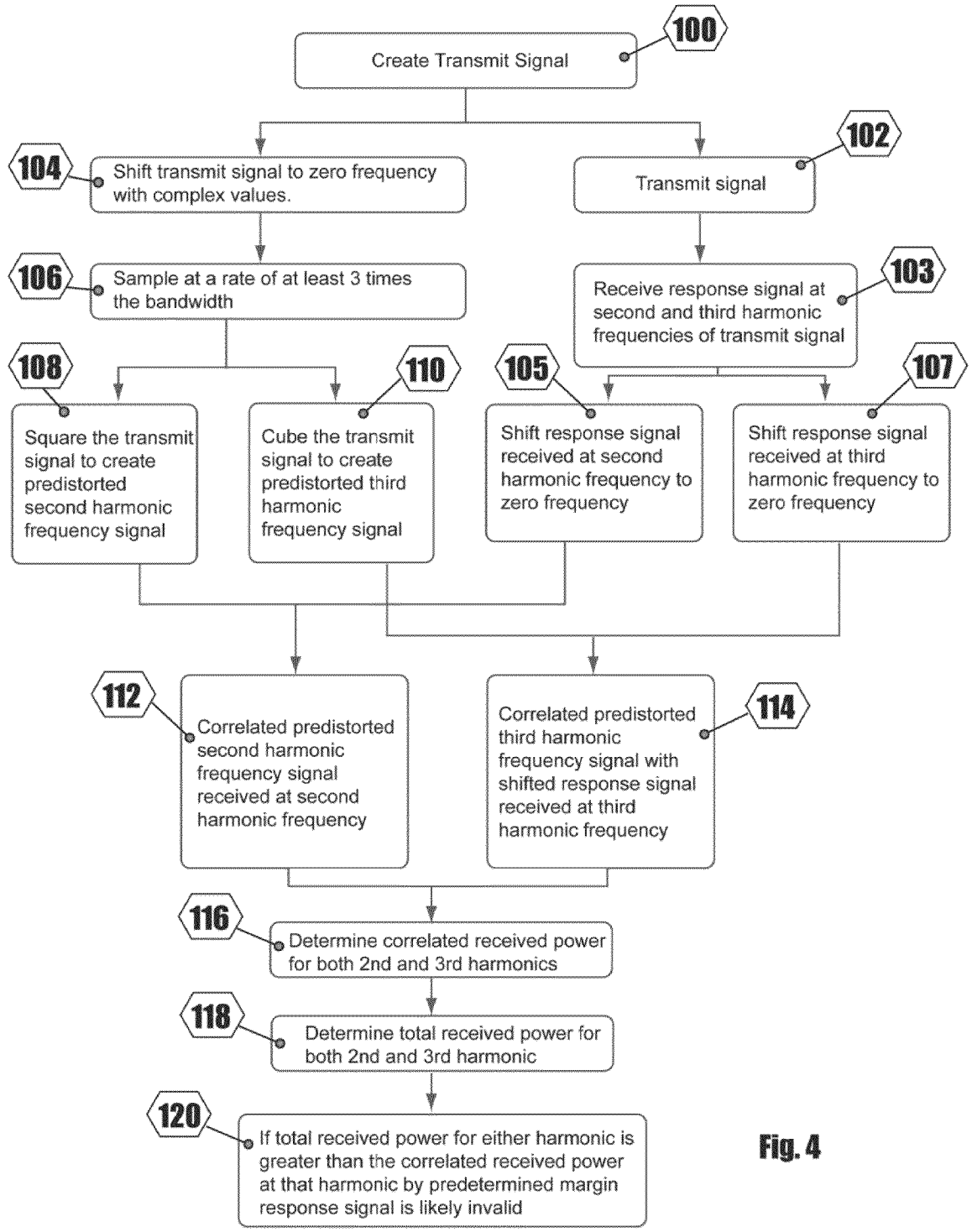
FIG. 4 is a flow chart of a pre-distortion correlation process of a non-linear junction detector constructed in accordance with an embodiment of the present invention.

Referring now to FIG. 4, a flow chart of a preferred pre-distortion correlation method of a non-linear junction detector constructed in accordance with an embodiment of the present invention is shown. The NLJD preferably uses harmonic pre-distortion for cross correlation at the baseband frequency. The method begins with the creating of a transmit signal, step 100, that is then transmitted in a base frequency band, step 102. In order to correlate the transmit and receive signal based on a harmonic response from an electronic target, the transmit signal is pre-distorted in approximately the same way that the target will distort the signal. While it is possible to frequency multiply the transmit signal in hardware and use an additional receiver channel to digitize this for correlation, this is not desirable due to the size, cost and power. Preferably, this is accomplished digitally in software. To digitally pre-distort the transmit signal, the transmit signal is shifted to zero frequency with complex values, step 104. The transmit baseband signal is then sampled at a rate at least three times the transmit baseband bandwidth, step 106, and then squared, step 108, or cubed, step 110, respectively for the second or third harmonic. The sampling rate in step 106 must be sufficiently high so that the wider frequency spectrum does not result in aliasing. This is most preferably two or three times the bandwidth of the transmit signal for second and third harmonics respectively, but could be higher if desired.

The possible response to the transmit signal is received at the second and third harmonic frequencies of the transmitted signal in step 103 and the results are frequency shifted back to zero frequency into the original transmit bandwidth in steps 105 and 107. The result from steps 108 and 110 is then correlated in steps 112 and 114 with the receive signal for each harmonic that has been frequency shifted to the base frequency band in steps 105 and 107.

By generating the correlated received power for each harmonic frequency, step 116, in addition to a measure of the total received power for each harmonic frequency in step 118, it is possible to differentiate between a correlation response that is being produced by an interfering signal rather than a response signal from a target junction. If it is determined that the total received power is greater than the correlated received power for either harmonic frequency by a predetermined margin in step 120, it can be assumed that the response is not be valid. The margin is determined experimentally and will depend upofn the conditions but in normal conditions the difference between a response signal and an interfering signal will be readily apparent by comparing the total receiver power with the pre-distorted correlated power. The NLJD can automatically change the transmission channel or notify the user of any interfering signal condition. If the interference is in short bursts, for example as may occur as the result of the transmission of data packets, the receiver can simply discard the recorded data for the duration of the interference. Thus, target and interference differentiation can be performed by comparing the received power and correlation power levels.

The transmit waveform can be used to mimic other existing ambient environment signals within the operating band. For example, the transmit waveform can be made to look like a normal Wi-Fi signal or other existing RF signals in the 2.4 GHz band. This is beneficial in that the bandwidth is generally available for use and the transmit signal will appear no different than existing ambient signals.

Although there have been described particular embodiments of the present invention of a new and useful Spread Spectrum Non-linear Junction Detector, it is not intended that such references be construed as limitations upon the scope of this invention except as set forth in the following claims.

What is claimed is:

1. A non-linear junction detector comprising:
   a transmitter that produces and transmits a digitally modulated spread spectrum transmit signal;
   a receiver that receives a second harmonic response and a third harmonic response at harmonic frequencies of the digitally modulated spread spectrum transmit signal;
   a display that displays:
      a second harmonic signal strength received by said receiver at a second harmonic frequency of said digitally modulated spread spectrum transmit signal; and
      a third harmonic signal strength received by said receiver at a third harmonic frequency of said digitally modulated spread spectrum transmit signal;
   a receiver chain that correlates the digitally modulated spread spectrum transmit signal with the received second and third harmonic responses to produce a correlated response; and
   an algorithm that compares the correlated response to a received signal strength.

2. The non-linear junction detector of claim 1 wherein said receiver chain pre-distorts the digitally modulated spread spectrum transmit signal to produce a predicted second and a predicted third harmonic response to correlate with said received signal strength.

3. The non-linear junction detector of claim 2 wherein said receiver chain squares and cubes said digitally modulated spread spectrum transmit signal to pre-distort said digitally modulated spread spectrum transmit signal.

4. The non-linear junction detector of claim 1 wherein said receiver chain mixes or modulates the received second or third harmonic response to an alternate frequency to correlate the second or third harmonic response with said digitally modulated spread spectrum transmit signal.

5. The nonlinear junction detector of claim 1 wherein said display further displays a frequency swept response received by said receiver in response to said digitally modulated spread spectrum transmit signal.

6. The nonlinear junction detector of claim 1 wherein said digitally modulate(spread spectrum transmit signal mimics a standard commercially used waveform such as a WIFI, Bluetooth, CDMA, GSM, 3G, or LTE signal.

7. The non-linear junction detector of claim 1 wherein said display further displays a histogram of the received second or third harmonic responses as a function of time.

8. The non-linear junction detector of claim 1 wherein said display is a touch screen display.

9. The non-linear junction detector of claim 1 wherein said non-linear junction detector utilizes a direct connection to a conductor or cable to detect non-linear junctions that are potentially associated with said conductor or cable.

10. The non-linear junction detector of claim 1 wherein said receiver is capable of receiving in the transmit frequency band.

11. The non-linear junction detector of claim 1 wherein said non-linear junction detector further comprises a haptic feedback device.

12. The non-linear junction detector of claim 1 wherein said non-linear junction detector further comprises an algorithm to analyze correlated responses as a function of time to discriminate between corrosive and electronic non-linear junctions.

* * * * *